United States Patent [19]
Dage

[11] Patent Number: 6,112,807
[45] Date of Patent: Sep. 5, 2000

[54] SYSTEM AND METHOD FOR DEFOGGING A VEHICLE WINDOW

[75] Inventor: Gerhard Allan Dage, Franklin, Mich.

[73] Assignee: Ford Motor Company, Dearborn, Mich.

[21] Appl. No.: 09/087,881

[22] Filed: Jun. 1, 1998

[51] Int. Cl.[7] .................................................. B60H 1/00
[52] U.S. Cl. ..................... 165/202; 165/43; 165/204; 165/228; 165/249; 165/263; 62/176.6; 62/203; 62/229; 236/13; 236/44 C
[58] Field of Search ................... 62/176.6, 180, 62/203, 229; 236/13, 44 C; 165/42, 43, 202, 204, 228, 249, 225, 263

[56] References Cited

U.S. PATENT DOCUMENTS

| | | | |
|---|---|---|---|
| 4,408,712 | 10/1983 | Naganoma et al. | 236/13 |
| 4,540,040 | 9/1985 | Fukumoto et al. | 62/229 X |
| 4,709,751 | 12/1987 | Ichimaru et al. | 165/204 |
| 4,783,970 | 11/1988 | Takahashi | 62/176.6 X |
| 4,920,755 | 5/1990 | Tadahiro | 62/176.6 X |
| 5,516,041 | 5/1996 | Davis, Jr. et al. | 236/44 C X |
| 5,570,838 | 11/1996 | Davis, Jr. et al. | 236/44 C X |
| 5,634,348 | 6/1997 | Ikeda et al. | 62/180 X |
| 5,755,378 | 5/1998 | Dage et al. | 165/204 X |

FOREIGN PATENT DOCUMENTS

| | | | |
|---|---|---|---|
| 316545 | 9/1988 | European Pat. Off. | 62/176.6 |
| 0071618 | 6/1981 | Japan | 236/13 |
| 0090719 | 7/1981 | Japan | 62/180 |
| 0144119 | 9/1982 | Japan | 62/176.6 |
| 0175412 | 10/1982 | Japan | 62/176.6 |
| 0031917 | 2/1990 | Japan | 165/42 |
| 406270645 | 9/1994 | Japan | 62/229 |

*Primary Examiner*—Christopher Atkinson
*Attorney, Agent, or Firm*—Raymond L. Coppiellie

[57] ABSTRACT

There is disclosed a system and method for preventing fogging of the windows of an automotive vehicle. The system and method operate the air conditioning system of the vehicle at temperatures where a high degree of probability of fogging exists. The method includes the steps of measuring the ambient temperature, the evaporator core temperature and operating the air conditioning compressor at specific duty cycles depending upon these temperatures. The duty cycle will be determined based upon these temperature variables as well as the relative humidity within the passenger cabin of the vehicle.

7 Claims, 3 Drawing Sheets

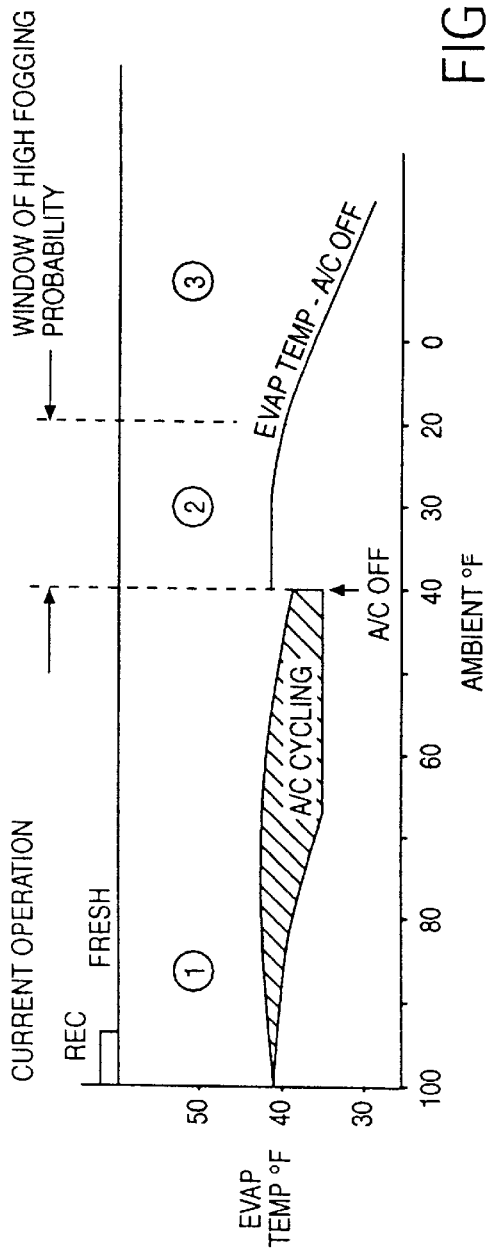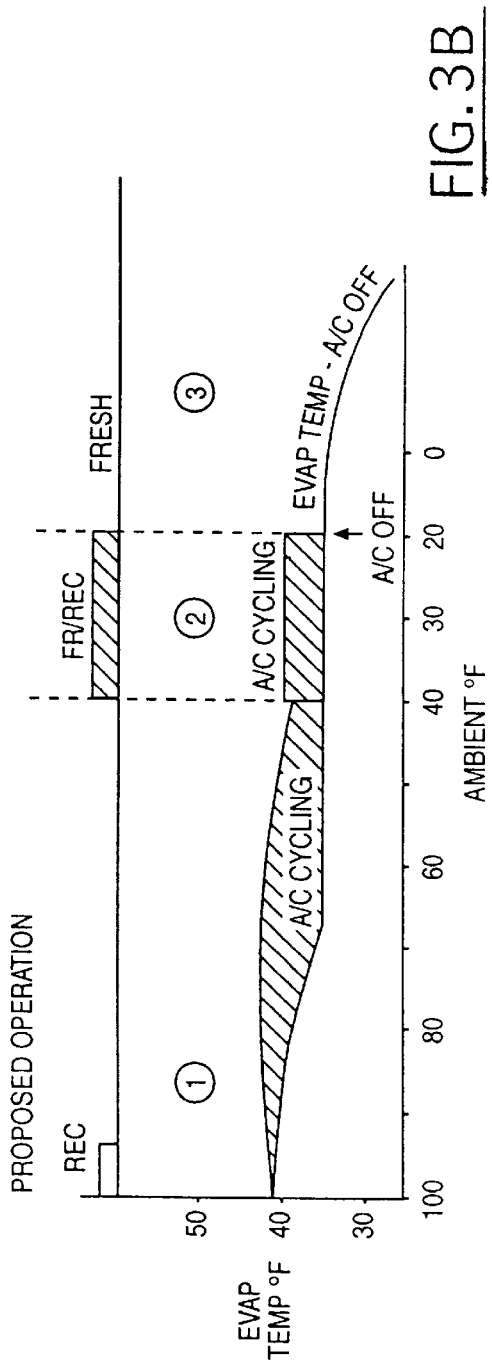

SYSTEM AND METHOD FOR DEFOGGING A VEHICLE WINDOW

BACKGROUND OF THE INVENTION

1. Field of the Invention

The present invention relates generally to an air conditioning system for an automotive vehicle. More particularly, the present invention relates to a method and system for controlling an automotive heating, ventilating and air conditioning system to prevent fogging.

2. Disclosure Information

A fundamental goal of automotive heating, ventilating and air conditioning (HVAC) systems is to provide comfort to vehicle occupants as well as to avoid window fogging conditions. During normal air conditioning operation, moisture retention on the evaporator and within the evaporator case of the HVAC system has been the cause for fogging within the vehicle cabin. Additionally, moisture brought into the vehicle as a result of natural human functions such as breathing, perspiration, wet umbrellas, snow on clothing, etc., all contribute to the overall moisture content within the passenger cabin of the vehicle. In general, interior window fog elimination is simply a process of dehumidifying the cabin by operating the air conditioning system and further by warming this "dry air" and distributing it to the effected glass areas.

The process of keeping the vehicle glass fog free for general operating conditions is understood and currently controlled by the operator of a vehicle in an open loop fashion. For example, it is commonly known to turn the air conditioning on or activate the defrost mode (which also activates the air conditioning in many vehicles) when fogging is visible. Improvements to existing systems have been suggested, such as in U.S. Pat. No. 5,516,041, assigned to the assignee of the present invention and herein incorporated by reference. The system of the '041 patent closes the known open loop with a humidity sensor which provides input to an algorithm which calculates fog probability and automatically takes fog preventive correction actions. These processes work well as intended, however, they are limited to "normal" air conditioning operating conditions.

Presently, the typical air conditioning system as described above controls window defogging only for temperatures down to approximately 42° F. Normally, at temperatures below 42° F., the air conditioning operation is deactivated to prevent a wet evaporator core from freezing. A frozen evaporator core will block air flow through the ducting system of the air conditioning system.

However, the greatest probability of fogging occurs in the spring and fall of the year between temperatures of 25°–45° F. During this time of year, a low pressure switch in the A/C system keeps the A/C system off, offering no dehumidification and when the vehicle heater is in the medium to full operation, the fogging probability is high. As the passenger cabin warms up, it has a greater capacity to hold moisture and the interior relative humidity increases. If the dew point is reached, moisture will form on the cooler surfaces within the passenger cabin, normally the inside of the glass which is exposed to a cooler exterior ambient temperature. Interior relative humidity can increase significantly during these conditions and are further increased when the operator brings moisture into the cabin in the form of a wet raincoat or clothing covered with snow. This combination of warming the cabin, melting snow and a cold ambient temperature is a perfect condition for fogging to occur. In current air conditioning systems, the air conditioning does not operate at the ambient temperatures at which these conditions typically occur.

Therefore, it would be advantageous to modify an air conditioning system to provide for air conditioning operation during the times of high fogging probability and yet prevent freezing of the evaporator within the system. Furthermore, it would be advantage to provide such a system at relatively low cost with no equipment changes to the present air conditioning system. It is an object of the present invention to provide such a system and a method for preventing fogging during these conditions.

SUMMARY OF THE INVENTION

The present invention overcomes the disadvantages of the prior art by providing a method and system for controlling a heating, ventilating and air conditioning system of a vehicle which discharges a flow of air to a passenger cabin of the vehicle. The system includes a variable speed blower, ducting, a compressor, an evaporator, a heater core for heating air in the duct, a control element having control positions for varying refrigerating and heating capacity of the compressor and evaporator, a pressure cycling switch for controlling operation of the compressor, a plurality of blend doors having various control positions for controlling the direction of air flow and the ratio of fresh air to recirculated air through the duct work, a humidity sensor for sensing relative humidity within the cabin and providing a corresponding relative humidity signal and temperature sensors for sensing temperature within the cabin and of the evaporator and providing corresponding temperature signals for ambient and evaporator temperatures. The method of the present invention comprises the steps of measuring the ambient and evaporator temperatures and generating an ambient temperature and evaporator temperature signal. The method then bypasses the pressure cycling switch and cycles a control element on and off within the system according to a predetermined duty cycle when the ambient and evaporator temperature signals are within a predetermined range. The method further contemplates moving the blend doors to predetermined positions based upon the ambient and evaporator temperature signals to pass a predetermined amount of recirculated air through the evaporator. The method of the present invention will operate the air conditioning system of the vehicle at ambient temperatures between 20° and 40° F. to prevent fogging of the passenger cabin windows.

It is an advantage of the present invention that interior window fogging can be prevented by operating the air conditioning system of the vehicle at temperatures lower than 40° F. It is an advantage that the air conditioning system can be operated during conditions of highest probability of fogging within the passenger cabin of the vehicle.

BRIEF DESCRIPTION OF THE DRAWINGS

FIGS. 3A and 3B are schematic representations of the operation of A/C systems.

DETAILED DESCRIPTION OF PREFERRED EMBODIMENTS

Figure 1:
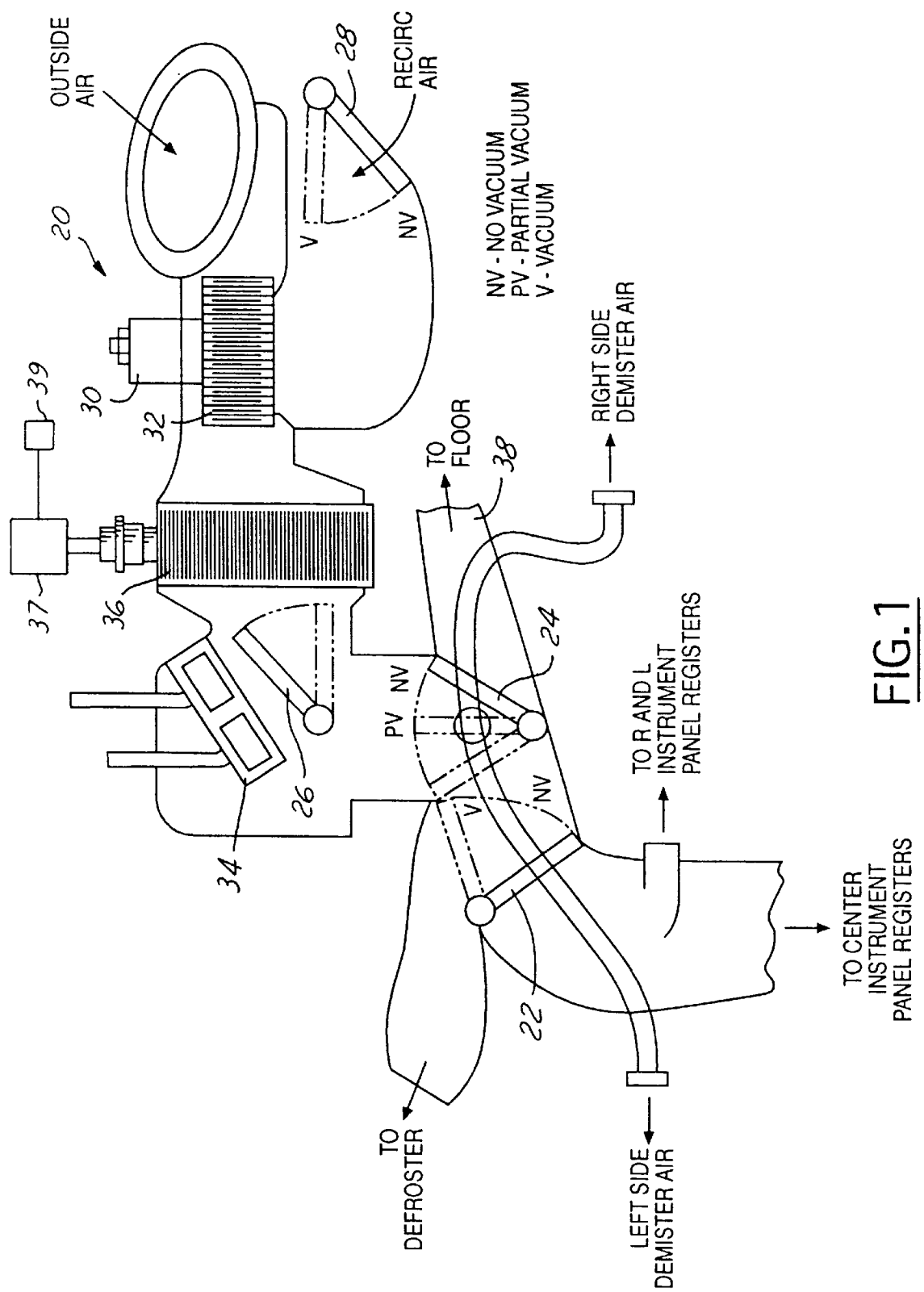
FIG. 1 is a schematic diagram illustrating an air handling system which can be controlled by the method and control system of the present invention.

In general, control of temperature and defogging of the windshield within an automobile is accomplished using various actuators to adjust the temperature and flow of air supplied to the cabin of the vehicle. FIG. 1 shows schematically an air handling system of an HVAC (heating, ventilating and air conditioning) system, generally indicated at 20. The system 20 includes the arrangement of air flow doors, including panel-defrost, floor-panel, and outside recirculated air actuators or doors 22, 24, and 28, respectively. The doors are part of a second air distribution system for directing the flow of conditioned air to various locations within the passenger cabin, such as to the windshield, floor or instrument panel as is commonly known. The doors 22, 24 and 28 are typically driven by vacuum motors (not shown) between their various vacuum, partial vacuum and no vacuum positions in a conventional fashion as indicated in FIG. 1, or may be driven by an electric servo motor. A temperature control blend door 26 is also provided, and preferably driven by an electric servo motor (not shown) also in a conventional fashion.

The system 20 also includes a variable speed blower motor or fan 30 including a blower wheel 32. The system further includes heating and cooling elements such as a heater core 34 and an evaporator core 36 and a typical vehicle air conditioning plant including a compressor 37. Each of the above components is in communication with the HVAC case in a first airflow distribution system and associated ducting 38 in order to control temperature, the direction of air flow and the ratio of fresh air to recirculated air. The system further includes a low pressure cycle switch 39 which communicates with the compressor 37. As will be explained in greater detail below, the low pressure switch 39 deactivates the compressor and evaporator when ambient temperature drops below a predetermined value to prevent freezing of the evaporator.

Figure 2:
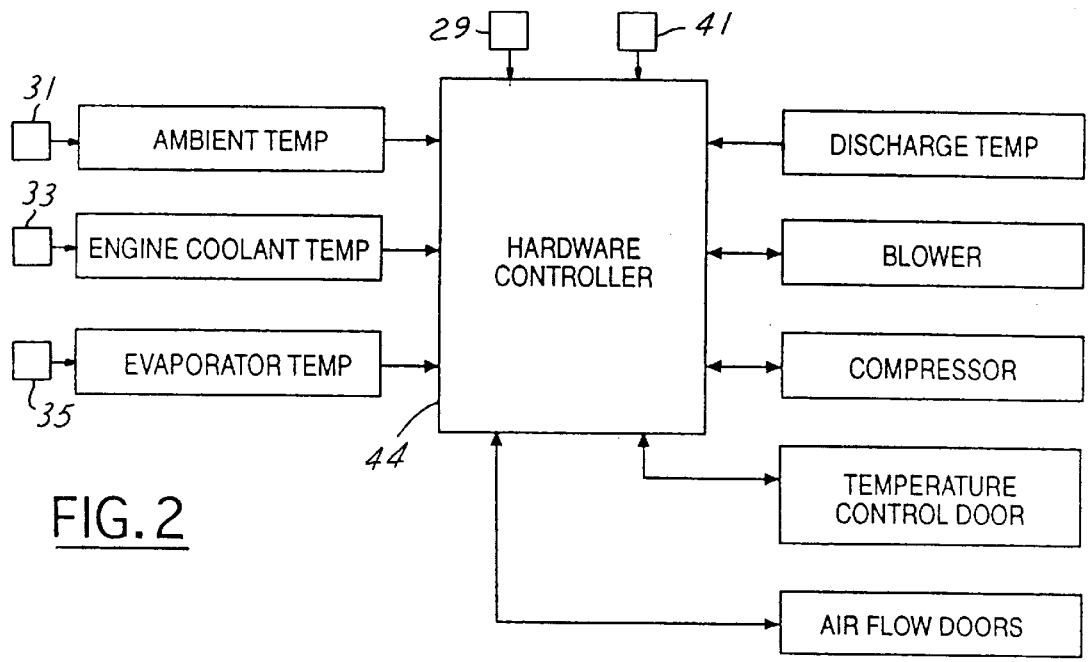
FIG. 2 is a schematic block diagram of the control system of the present invention.

For automatic control of the temperature and flow of air in the cabin, conditions within and outside the cabin are monitored by sensors and an electronic controller generates signals to control the actuators according to the conditions as indicated by the sensors. As illustrated in FIG. 2, a typical complement of sensors of the HVAC system, schematically shown as passenger cabin temperature sensor 29, ambient temperature sensor 31, engine coolant temperature sensor 33, evaporator temperature sensor 35 and humidity sensor 41 provide signals which are representative of interior cabin temperature, ambient (outside) air temperature, evaporator temperature, engine coolant temperature (ECT), relative humidity of the passenger cabin, discharge air temperature and sunload. In addition, there is a set signal or set temperature value indicating the desired temperature that is set manually by the driver.

The signals are provided to a hardware controller 44 as inputs. Hardware controller 44, in turn, controls the doors 22 through 28 to regulate the temperature and flow of air and ultimately to maintain the comfort of driver and passengers in the vehicle. The controller 44 also receives signals from the ignition switch 29 and the HVAC system 20 to indicate the operating of the switch 29 and system 20. The controller 44 preferably continually monitors the state of the ignition switch 29 and the state of the HVAC system 20.

Turning now to FIG. 3A, there is shown a schematic diagram illustrating the general operation of the cooling system of a typical air conditioning system. In the Area designated as "1", at ambient temperatures greater than 42° F. and evaporator temperatures greater than 38° F., the air conditioning system functions normally, with the compressor cycling on and off as a function of load. This is typically a 50% duty cycle with a 40 second period at an ambient temperature of 60° F. The Area marked "2" represents the window of the highest fogging probability at ambient temperatures of between 20° F. and 42° F. In the Area marked "3", the evaporator temperature is decreasing because the ambient temperature is below freezing. In the typical air conditioning system, the compressor is deactivated and kept off in the Areas marked "2" and "3". The low side pressure switch will keep the A/C off when the ambient temperature is below 42° F. to prevent freezing of the evaporator. Airflow cannot pass through the evaporator when it is frozen.

FIG. 3B is a schematic illustration of an A/C system operated in accordance with the method of the present invention. In Area "1", the A/C system functions as normal. In Area "2", the highest fogging probability window, the A/C is cycled according to a predetermined duty cycle with the blend doors being positioned to allow a predetermined ratio of fresh/recirculated air to pass through the evaporator. This positioning is determined by the controller to keep the evaporator temperature between 35° F. and 41° F. Allowing the compressor and A/C system to operate and partial recirculating air to flow through the second distribution system of air flow doors to the windows assists in defogging the windshield and windows by dehumidifying the passenger cabin area during these conditions which present the highest probability of window fogging. There is no change from a normal A/C system in Area "3". The specific duty cycles employed by the method the present invention depend on the inputs to the controller as will be explained with reference to FIG. 4.

Figure 4:
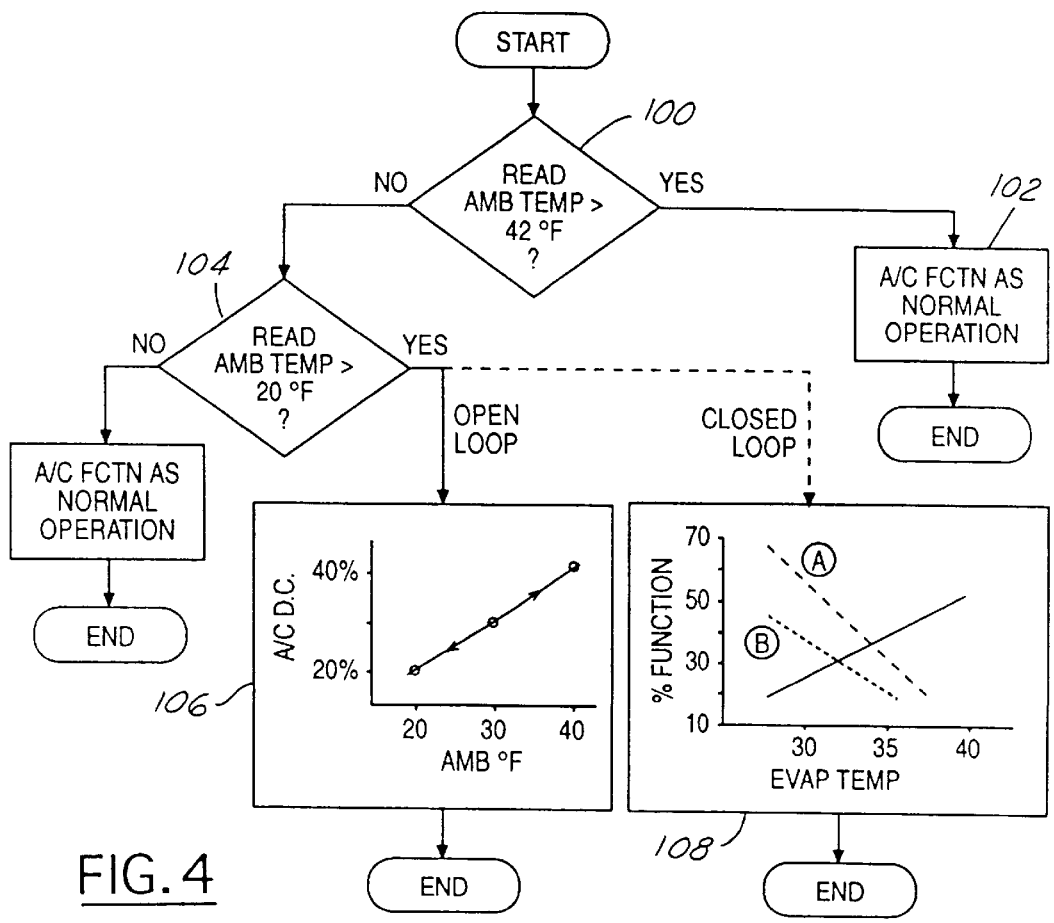
FIG. 4 is a flow diagram illustrating the general sequence of steps associated with the operation of the present invention.

FIG. 4 shows the general sequence of steps associated with the method of the present invention. Although the steps shown in FIG. 4 are depicted sequentially, they can be implemented utilizing interrupt-driven programming strategies, object-oriented programming, or the like.

The method begins with the step of receiving the ambient temperature signal at block 100. If the ambient temperature is greater than 42° F., the A/C system functions normally as shown at block 102. If the ambient temperature is less than 42° F., the method determines whether the ambient temperature is greater than 20° F. at block 104. If the ambient temperature is less than 20° F., the A/C system functions as normal and the low side pressure switch deactivates the compressor to prevent freezing of the evaporator. When the ambient temperature is between 20° F. and 42° F., the method of the present invention will bypass the low side pressure switch and operate the A/C according to one of two ways. In order to bypass the pressure switch without incurring system damages as a result of low refrigerant, the evaporator temperature sensor should record a cooler temperature upon turning the air conditioning system on (for all ambient conditions). If a cooler evaporator temperature is not observed within three minutes of operation, this low ambient override feature will not operate. The graph shown at 106 represents an open loop method of operating the A/C system according to the present invention. The compressor will be operated at a specific duty cycle as shown by the solid line on the graph depending on the ambient temperature. For example, at 30° F. ambient temp, the A/C compressor will be run at a 30% duty cycle, meaning that the compressor will be cycled on for 18 seconds and off for 42 seconds at intervals of approximately sixty seconds. Simultaneously, the blend door controlling the ratio of fresh air to recirculating air will be positioned as shown by the dotted line on the graph to allow recirculating air to pass through the evaporator. This will prevent the evaporator from freezing since the recirculating air is warmer than 32° F.

Graph 110 shows an alternative method of the present invention, it representing a closed loop system. Graph 110 is a measure of "% Function" versus evaporator temperature. The solid line represents the % duty cycle for the A/C system while the two dotted lines, lines A and B, represent the position of the recirculated blend door (26) expressed as percent opened. In an A/C system using this method, a relative humidity sensor measures the relative humidity of the interior passenger cabin. Line A represents the algorithm for operating the compressor when relative humidity is less than 50%, while line B represents the compressor operating algorithm when relative humidity is greater than or equal to 50%. As can be seen, the A/C duty cycle will increase linearly as the evaporator temperature increases. As the relative humidity and evaporator temperature increases, the recirculating door position is moving closer to closing since evaporator freezing is less likely to occur as ambient temperature increases. Stated another way, the percent opening of the recirculating air door decreases (door closes) as evaporator temperature and relative humidity increases. The percent open position of the recirculating air door changes as a linear function of the evaporator temperature.

In bypassing the normal operation of low side pressure switch and operating the A/C system between ambient temperatures of 20° F.–42° F., the probability of fogging is greatly decreased and evaporator freezing does not occur because warmer recirculating air is passed through the evaporator. It will be evident that the method of the present invention can be changed depending on ambient temperature, evaporator temperature and relative humidity, as well as other variables. Therefore, it is the following claims, including all equivalents, which define the scope of the invention.

What is claimed is:

1. A method for controlling a heating, ventilation and air conditioning (HVAC) system of a vehicle which discharges a flow of air to a passenger cabin of the vehicle, the system including a variable speed blower, a ducting, a compressor, an evaporator, a heater core for heating air in the ducting, a control element having control positions for varying refrigerating and heating capacity of the HVAC system, a pressure cycling switch for controlling operation of the compressor, a plurality of blend doors having various control positions for controlling direction of air flow and ratio of fresh air to recirculated air, a humidity sensor for sensing relative humidity within the passenger cabin and providing a corresponding relative humidity signal, and temperature sensors for sensing temperature within the passenger cabin, the evaporator, and ambient temperature and providing a corresponding passenger cabin temperature signal, an evaporator temperature signal and an ambient temperature signal, the method comprising the steps of:

measuring the ambient temperature and generating the ambient temperature signal;

measuring the temperature of the evaporator and generating the evaporator temperature signal;

bypassing the pressure cycling switch when the ambient temperature signal is below 42° F.;

cycling the control element on and off according to a predetermined duty cycle when the ambient temperature signal is below 42° F. and above 20° F.; and moving the plurality of blend doors to a predetermined position based upon the ambient temperature signal and the evaporator temperature signal.

2. A method according to claim 1, wherein said step of bypassing the pressure cycle switch further includes reading said evaporator temperature signal and bypassing said pressure cycle switch when said evaporator temperature reaches a predetermined range.

3. A method according to claim 2, wherein said predetermined evaporator range is defined is between 35 and 41 degrees F.

4. A method according to claim 1, wherein said predetermined duty cycle is a linear function of the ambient temperature.

5. A method according to claim 4, wherein said predetermined duty cycle is a linear function dependent upon the ambient temperature signal and the evaporator temperature signal.

6. A method according to claim 1, further including the step of measuring the relative humidity of the vehicle cabin and generating a relative humidity signal and altering the predetermined duty cycle and blend door positions based upon the relative humidity signal.

7. A method according to claim 6, wherein the plurality of blend doors allows a predetermined amount of recirculating air to pass over the evaporator.

* * * * *